(12) United States Patent
Hannewald

(10) Patent No.: US 8,240,637 B2
(45) Date of Patent: Aug. 14, 2012

(54) DEVICE FOR THE LINEAR DISPLACEMENT OF A VALVE MEMBER

(75) Inventor: Thomas Hannewald, Griesheim (DE)

(73) Assignee: Continental Automotive GmbH, Hannover (DE)

( * ) Notice: Subject to any disclaimer, the term of this patent is extended or adjusted under 35 U.S.C. 154(b) by 501 days.

(21) Appl. No.: 12/522,874

(22) PCT Filed: Jan. 4, 2008

(86) PCT No.: PCT/EP2008/050060
§ 371 (c)(1),
(2), (4) Date: Jul. 10, 2009

(87) PCT Pub. No.: WO2008/084012
PCT Pub. Date: Jul. 17, 2008

(65) Prior Publication Data
US 2010/0096575 A1 Apr. 22, 2010

(30) Foreign Application Priority Data
Jan. 11, 2007 (DE) .......................... 10 2007 001 741

(51) Int. Cl.
*F16K 31/44* (2006.01)
(52) U.S. Cl. ....... 251/229; 251/248; 251/279; 74/89.23; 74/89.27; 74/89.37; 74/520
(58) Field of Classification Search .................. 251/248, 251/213, 229, 265, 279; 74/89.23, 89.27, 74/89.37, 424.76, 424.72, 520
See application file for complete search history.

(56) References Cited

U.S. PATENT DOCUMENTS

| 535,614 | A | | 3/1895 | Corey, Jr. |
| 916,218 | A | * | 3/1909 | Tanner ........................... 251/272 |
| 1,658,445 | A | | 2/1928 | Knauf |
| 2,092,926 | A | * | 9/1937 | Lithgow ......................... 137/241 |
| 2,344,594 | A | * | 3/1944 | Bryant ........................... 74/89.14 |
| 2,354,987 | A | * | 8/1944 | Fawkes ............................ 74/520 |
| 2,370,604 | A | | 2/1945 | De Craene et al. |
| 2,515,498 | A | * | 7/1950 | De Craene et al. ............. 74/520 |
| 2,603,102 | A | * | 7/1952 | Hobbs .............................. 74/520 |
| 2,757,554 | A | * | 8/1956 | Niedhammer, Jr. et al. ..... 74/520 |

(Continued)

FOREIGN PATENT DOCUMENTS
DE 647981 C 7/1937
(Continued)

*Primary Examiner* — John Fristoe, Jr.
*Assistant Examiner* — Marina Tietjen
(74) *Attorney, Agent, or Firm* — Cozen O'Connor

(57) ABSTRACT

The device includes a spindle rotatably supported perpendicular to a value displacement direction and is made of a first spindle part and a second spindle part. The two parts are provided with outside threads configured in opposite directions to each other. On the first spindle part, a first nut having a complementary inside thread is applied. On the second spindle part, a second nut having a complementary inside thread is applied. The first nut includes a first bearing for the rotatable support of one end of a first connecting rib. The second nut comprises a second bearing for the rotatable support of one end of a second connecting rib. The other end of the first connecting rib and the other end of the second connecting rib are rotatably supported on a third bearing. Parallel to the spindle, on the side thereof facing away from the valve member, a stop is provided for the first nut and for the second nut, the stop surface extends perpendicular to the displacement direction of the valve member.

14 Claims, 2 Drawing Sheets

U.S. PATENT DOCUMENTS

| | | | |
|---|---|---|---|
| 4,206,900 A * | 6/1980 | Willis | 251/14 |
| 4,285,493 A * | 8/1981 | Willis | 251/14 |
| 4,715,580 A * | 12/1987 | Mueller | 251/229 |
| 6,969,048 B2 | 11/2005 | Colic et al. | |
| 7,097,148 B2 | 8/2006 | DeWall | |
| 7,172,169 B2 | 2/2007 | Biester | |
| 2009/0200420 A1 * | 8/2009 | Harvey et al. | 244/99.3 |

FOREIGN PATENT DOCUMENTS

| | | |
|---|---|---|
| DE | 20018564 U1 | 3/2002 |
| DE | 10327271 A1 | 2/2005 |
| GB | 841699 A | 7/1960 |
| JP | 54-27300 | 2/1979 |
| JP | 59-37385 A | 2/1984 |

* cited by examiner

DEVICE FOR THE LINEAR DISPLACEMENT OF A VALVE MEMBER

PRIORITY CLAIM

This is a U.S. national stage of application No. PCT/EP2008/050060, filed on Jan. 4, 2008, which claims Priority to the German Application No.: 10 2007 001 741.5, filed: Jan. 11, 2007 the contents of both being incorporated herein by reference.

BACKGROUND OF THE INVENTION

1. Field of the Invention

The invention relates to a device for the linear displacement of a valve member. The invention relates, furthermore, to the use of the device.

2. Prior Art

Valve members are known. DE 103 27 271 A1 describes a valve member for an additional control valve arrangement. In the valve member, on a shank, a cap-shaped disk is arranged, which is designed convexly with an apex toward the side facing away from the inlet valve. Such valve members are displaced linearly in the direction of the longitudinal axis of the shank as a function of the operating state of the valve. This takes place, as a rule, via a spindle drive, the spindle and the shank of the valve member having the same longitudinal axis. When relatively high forces act on the valve member during the operating phase, the load on the spindle increases considerably, and this may lead to the latter being damaged. Moreover, higher forces also act on the nuts which are attached on the spindle, and therefore these, too, may suffer damage.

U.S. Pat. No. 2,370,604 discloses a device for the linear displacement of a valve member that consists of a spindle rotatably mounted perpendicular to the direction of displacement, which consists of a first spindle part and of a second spindle part. The first and second spindle parts have external threads formed contradirectionally to one another. A first nut with a complementary internal thread is attached on the first spindle part and a second nut with a complementary internal thread is attached on the second spindle part. The first nut has a first bearing for the rotatable mounting of one end of a first connecting web perpendicular to the axis of rotation of the spindle and the second nut has a second bearing for the rotatable mounting of one end of a second connecting web perpendicular to the axis of rotation of the spindle. The other end of the first connecting web and the other end of the second connecting web are rotatably mounted jointly perpendicular to the axis of rotation of the spindle on a third bearing which is arranged on the stop for the valve member. The direction of displacement of the valve member, the middle of the third bearing, and the middle of the spindle always lying on a line L in the side view.

SUMMARY OF THE INVENTION

An object on which the invention is based is to provide a device for the linear displacement of a valve member, which remains operational, without damage, even when higher forces act abruptly on the valve member.

According to one embodiment of the invention, on the side of the spindle which faces away from the valve member, a stop for the first nut and for the second nut is arranged parallel to said spindle, the stop face runs perpendicular to the direction of displacement of the valve member. The valve member is used in a valve or, generally, in a switch-off member. The first bearing and the second bearing are, for example, in each case arranged laterally on the first nut and on the second nut. The first connecting web and the second connecting web are, for example, a flat steel bar. The arrangement of the other end of the first connecting web and of the other end of the second connecting web on a third bearing likewise takes place, for example, laterally on the stop for the valve member. The stop for the first nut and for the second nut may be of one-part or multipart design. In normal operation, a spacing, which is formed by a gap, is present between the first nut and the second nut, and the stop for the first nut and the second nut.

According to one embodiment of the invention, a device for the linear displacement of a valve member consists of a spindle rotatably mounted perpendicular to the direction of displacement, wherein the spindle consists of a first spindle part and a second spindle part which each have external threads designed contradirectionally to one another. A first nut with a complementary internal thread is attached on the first spindle part and a second nut with a complementary internal thread is attached on the second spindle part. The first nut has a first bearing for the rotatable mounting of one end of a first connecting web perpendicular to the axis of rotation of the spindle and the second nut has a second bearing for the rotatable mounting of one end of a second connecting web perpendicular to the axis of rotation of the spindle. The other end of the first connecting web and the other end of the second connecting web are rotatably mounted jointly perpendicular to the axis of rotation of the spindle on a third bearing which is arranged on the stop for the valve member. The direction of displacement of the valve member, the middle of the third bearing and the middle of the spindle always lying on a line L in the side view. On the side of the spindle, which faces away from the valve member, a stop for the first nut and for the second nut is arranged parallel to said spindle, the stop face of which stop runs perpendicular to the direction of displacement of the valve member. The valve member is used in a valve or, generally, in a switch-off member. The first bearing and the second bearing are, arranged laterally on the first nut and on the second nut. The first connecting web and the second connecting web are each a flat steel bar. The arrangement of the other end of the first connecting web and of the other end of the second connecting web on a third bearing likewise takes place laterally on the stop for the valve member. The stop for the first nut and for the second nut may be of one-part or multipart design. In normal operation, a spacing, which is formed by a gap, is present between the first nut and the second nut and the stop for the first nut and the second nut. The middle of the spindle connects the first spindle part to the second spindle part.

It has been shown that the device for the linear displacement of a valve member experiences no damage of any kind even when higher forces act abruptly on the valve member. To be precise, in the event of an abruptly higher action of forces on the valve member, this has the effect that the spindle flexes slightly and the first nut and the second nut then bear directly against the stop for the first nut and for the second nut. The higher impact force then introduced into the device via the valve member is absorbed directly in the stop for the first nut and for the second nut, so that damage to the spindle or to the first nut or to the second nut is avoided. In order to ensure the corresponding flexion of the spindle, the spindle is designed to an engineering standard with regard to its dimensioning. In this case, the maximum impact force which can act on the valve member during operation is assumed.

According to a preferred embodiment of the invention, there is provision for the stop for the valve member to bear on its side facing away from the valve member against a spring element. The spring force acts on the stop in the direction of the linear displacement of the valve member in order to close or open the valve. In this case a compression spring system is used as a spring element. In this case, it is advantageous that, as a result of the action of the spring element, the respective play in the bearings and in the nuts is successfully compensated, thereby additionally contributing to a situation where abrupt actions of force on the valve member do not lead to any damage within the device.

According to a further preferred embodiment of the invention, the spindle is rotatably mounted in the region of its ends in a first spindle bearing and a second spindle bearing. The first spindle bearing and the second spindle bearing may in this case be designed in structural terms such that they simultaneously serve as stops for the first nut or the second nut when the valve is open. As a result, the spindle is advantageously fixed and the stability of the device is thereby increased.

In a further preferred embodiment of the invention, the middle of the spindle has a larger outside diameter than the first spindle part and the second spindle part. The middle of the spindle can serve as a stop for the first nut and the second nut in the closed state of the valve, thereby additionally improving the stability of the device.

A subject of the invention, is, the use of the device in disk valves with hydraulic oil in motor vehicles. Vibrations of the internal combustion engine can thereby be damped as a function of the rotational speed. The valve member can be set in linear displacement promptly, even when the motor vehicle drives, for example, through a pothole, the result of this usually being that pronounced impact forces act on the valve member. Even in such instances, damage to the device can be successfully avoided.

BRIEF DESCRIPTION OF THE DRAWINGS

The invention is explained below in more detail, and by way of example, with reference to the drawings in which.

DETAILED DESCRIPTION OF THE DRAWINGS

Figure 1:
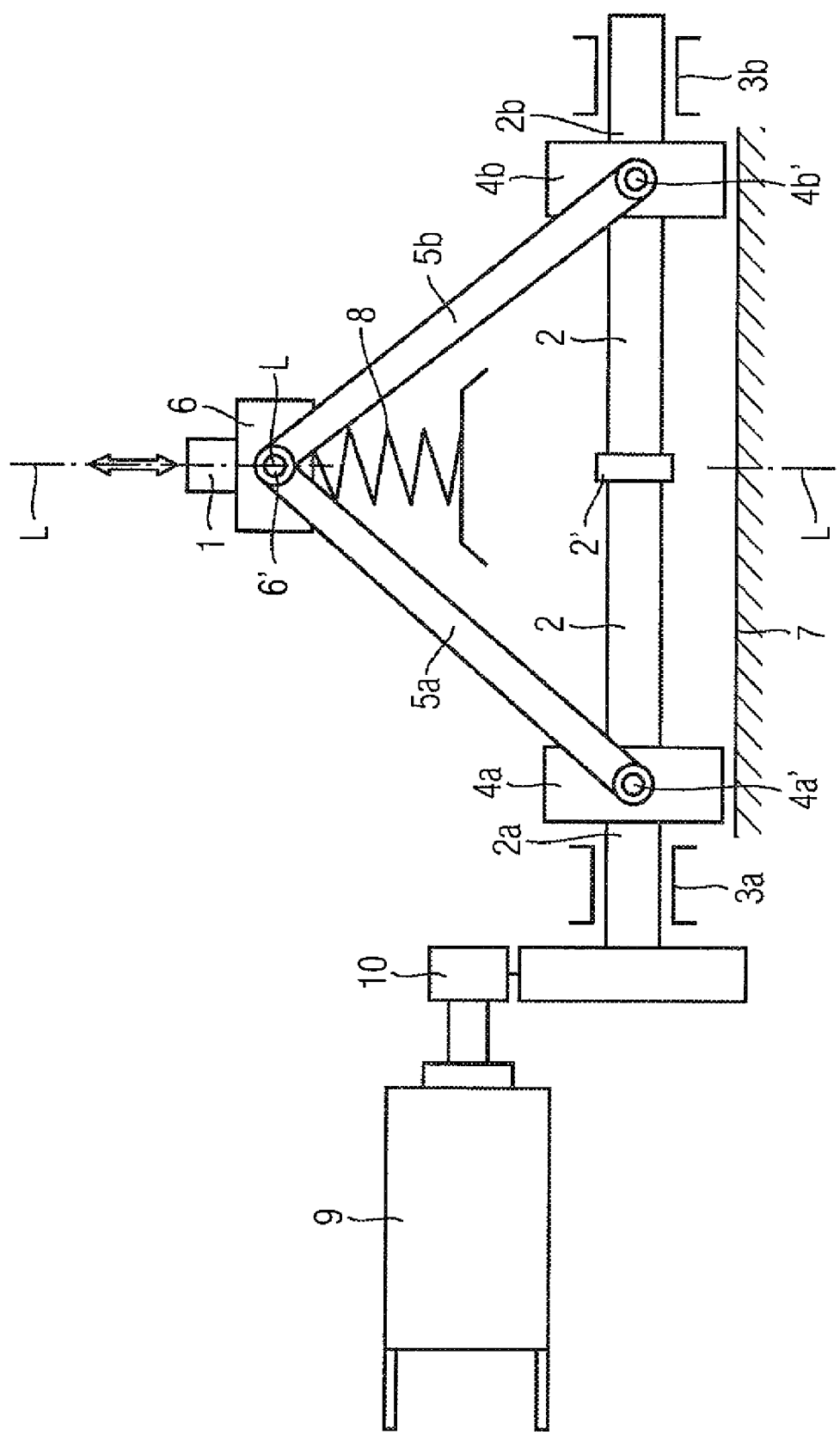
FIG. 1 is a device for the linear displacement of a valve member in the side view, in an open state of the valve.

The device for the linear displacement of a valve member 1 is illustrated in the side view in FIG. 1. In this, the valve member 1 is illustrated only diagrammatically.

The device consists of a spindle 2 which is rotatably mounted perpendicular to the direction of displacement and which consists of a first spindle part 2a and of a second spindle part 2b. The first spindle part 2a and the second spindle part 2b have in each case external threads designed contradirectionally to one another. A first nut 4a with a complementary internal thread is attached on the first spindle part 2a and a second nut 4b with a complementary internal thread is attached on the second spindle part 2b. The first nut 4a has a first bearing 4a' for the rotatable mounting of one end of a first connecting web 5a perpendicular to the axis of rotation of the spindle 2. The second nut 4b has a second bearing 4b' for the rotatable mounting of one end of a second connecting web 5b perpendicular to the axis of rotation of the spindle 2. The other end of the first connecting web 5a and the other end of the second connecting web 5b are rotatably mounted jointly on a third bearing 6' perpendicular to the axis of rotation of the spindle 2. The third bearing 6' is arranged on the stop 6 for the valve member 1. The direction of displacement of the valve member, illustrated by the equivalence arrow, the middle of the third bearing 6' and the middle 2' of the spindle 2 always lie on a line L in the side view. The middle 2' of the spindle 2 connects the first spindle part 2a to the second spindle part 2b. On the side of the spindle 2 which faces away from the valve member 1, a stop 7 for the first nut 4a and the second nut 4b is arranged parallel to said spindle, the stop face of the stop runs perpendicular to the direction of displacement of the valve member 1. The stop 6 for the valve member 1 bears, on its side facing away from the valve member 1, against a spring element 8 which is designed as a compression spring system. The spring force of the spring element 8 acts on the stop 6 in the direction of linear displacement of the valve member in order to close the valve and, by respectively forestalling the play between the individual parts of the device, prevents rattling within the device during operation. The spindle 2 is rotatably mounted in the region of its ends on a first spindle bearing 3a and on a second spindle bearing 3b. The middle 2' of the spindle 2 has a larger outside diameter than the first spindle part 2a and the second spindle part 2b. The middle 2' can therefore act as a stop for the first nut 4a and the second nut 4b. Starting from the open state of the valve, illustrated in FIG. 1, the spindle 2 is set in corresponding rotational movement via an electric motor 9 and a following gear 10. As a result of the contradirectionally designed external threads on the first spindle part 2a and on the second spindle part 2b, the first nut 4a and the second nut 4b are moved on the spindle 2 in the direction of the middle 2', the result of this being that the valve member 1 is displaced linearly away from the spindle 2. This operation is continued until the desired closed state of the valve is reached.

Figure 2:
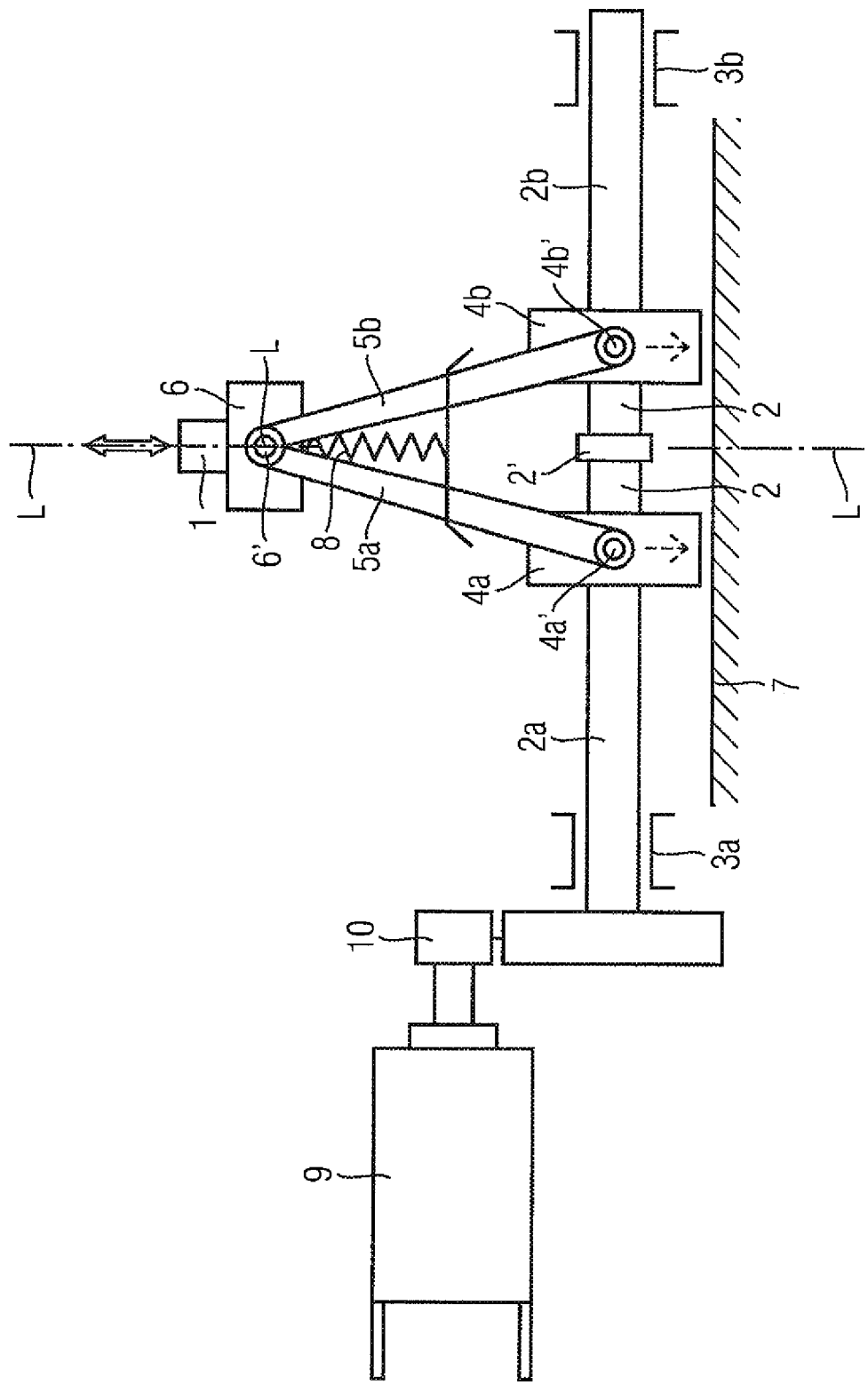
FIG. 2 is the device for the linear displacement of the valve member in the side view, in a closed state of the valve.

FIG. 2 illustrates the side view of the device for the linear displacement of the valve member 1 in the closed state of the valve. In the embodiment illustrated in FIG. 2, the first nut 4a and the second nut 4b do not bear against the middle 2' of the spindle 2 in the closed state of the valve (not illustrated). If higher forces act abruptly on the valve member 1 in the then closed state of the valve, this leads to a return movement of the valve member 1 in the direction of the spindle 2. If the impact forces in this case occurring are sufficiently high, this leads necessarily to a slight flexing of the spindle 2. When the device is used in disk valves with hydraulic oil in motor vehicles, in this case, for example, flexions of 0.2 mm have been implemented. The result of such a slight flexion of the spindle 2 is that the first nut 4a and the second nut 4b are pressed toward the stop 7 for the first nut 4a and for the second nut 4b, this being indicated by the dashed arrows. As soon as the first nut 4a and the second nut 4b bear (not illustrated) against the stop 7 for the first nut 4a and for the second nut 4b, the impact forces are introduced into the stop 7 for the first nut 4a and the second nut 4b and then can no longer damage the individual parts of the device for the linear displacement of a valve member 1, as would be the case, for example, if the impact forces had to be absorbed by a spindle which would be used for the linear displacement of the valve member, in which case the longitudinal axis of said spindle would be identical to the longitudinal axis of the shank of the valve member (not illustrated).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device configured to linearly displace a valve member, the device comprising:
    a spindle rotatably mounted with an axis of rotation perpendicular to a direction of displacement of the valve member, the spindle comprising:
    a first spindle part having a first external thread in a first direction; and
    a second spindle part having a second external thread in a second direction opposite the first direction;
    a first nut threaded on the first spindle part;
    a second nut threaded on the second spindle part;
    a first web having a first end and a second end;
    a second web having a first end and a second end;
    a first bearing perpendicular to the axis of rotation of the spindle coupled to the first nut, the first end of the first web rotatably mounted to the first bearing;
    a second bearing perpendicular to the axis of rotation of the spindle coupled to the second nut, the first end of the second web rotatably mounted to the second bearing;
    a first stop for the valve member;
    a third bearing mounted to the stop, the second ends of the first and second webs rotatably mounted to the third bearing;
    a second stop for the first nut and the second nut arranged parallel to the spindle on a side of the spindle facing away from the valve member, a stop face of the stop being perpendicular to the direction of displacement of the valve member,
    wherein the direction of displacement of the valve member, a middle of the third bearing, and a middle of the spindle are each arranged in a line facing away from the valve member; and
    a spring element, the spring element bearing on the first stop opposite the valve member,
    wherein the spring force acts on the stop in the direction of displacement of the valve member configured to close or open the valve.

2. The device for the linear displacement of a valve member according to claim 1, further comprising first and second spindle bearings configured to rotatably mount the spindle at its ends.

3. The device for the linear displacement of a valve member according to claim 1,
    wherein the device is configured to displace a valve member in a disk valve with hydraulic oil.

4. The device for the linear displacement of a valve member according to claim 1, further comprising:
    an electric motor; and
    a following gear coupling the electric motor to the spindle configures to rotationally drive the spindle.

5. The device for the linear displacement of a valve member according to claim 4,
    wherein rotating the spindle in a first direction causes the first and second nuts to move away from each other along the spindle and
    rotating the spindle in a second direction causes the first and second nuts to move toward each other along the spindle.

6. The device for the linear displacement of a valve member according to claim 5,
    wherein as the first and second nuts move away from each other, a distance between the stop and the spindle decreases.

7. The device for the linear displacement of a valve according to claim 1, wherein the spindle is configured for flexing.

8. The device for the linear displacement of a valve according to claim 7, wherein the flexion is about 2 mm.

9. A device configured to linearly displace a valve member, the device comprising:
    a spindle rotatably mounted with an axis of rotation perpendicular to a direction of displacement of the valve member, the spindle comprising:
    a first spindle part having a first external thread in a first direction; and
    a second spindle part having a second external thread in a second direction opposite the first direction;
    a first nut threaded on the first spindle part;
    a second nut threaded on the second spindle part;
    a first web having a first end and a second end;
    a second web having a first end and a second end;
    a first bearing perpendicular to the axis of rotation of the spindle coupled to the first nut, the first end of the first web rotatably mounted to the first bearing;
    a second bearing perpendicular to the axis of rotation of the spindle coupled to the second nut, the first end of the second web rotatably mounted to the second bearing;
    a first stop for the valve member;
    a third bearing mounted to the stop, the second ends of the first and second webs rotatably mounted to the third bearing;
    a second stop for the first nut and the second nut arranged parallel to the spindle on a side of the spindle facing away from the valve member, a stop face of the stop being perpendicular to the direction of displacement of the valve member,
    wherein the direction of displacement of the valve member, a middle of the third bearing, and a middle of the spindle are each arranged in a line facing away from the valve member and
    wherein the middle of the spindle has a larger outside diameter than the first spindle part and the second spindle part.

10. The device for the linear displacement of a valve according to claim 9, wherein the spindle is configured for flexing.

11. The device for the linear displacement of a valve according to claim 10, wherein the flexion is about 2 mm.

12. The device for the linear displacement of a valve member according to claim 9, further comprising:
    an electric motor; and
    a following gear coupling the electric motor to the spindle configures to rotationally drive the spindle.

13. The device for the linear displacement of a valve member according to claim 12,
    wherein rotating the spindle in a first direction causes the first and second nuts to move away from each other along the spindle and
    rotating the spindle in a second direction causes the first and second nuts to move toward each other along the spindle.

14. The device for the linear displacement of a valve member according to claim 13,
    wherein as the first and second nuts move away from each other, a distance between the stop and the spindle decreases.

* * * * *